(12) United States Patent
Markham

(10) Patent No.: US 6,364,524 B1
(45) Date of Patent: Apr. 2, 2002

(54) HIGH SPEED INFRARED RADIATION THERMOMETER, SYSTEM, AND METHOD

(75) Inventor: James R. Markham, Middlefield, CT (US)

(73) Assignee: Advanced Fuel Research, Inc, East Hartford, CT (US)

( * ) Notice: Subject to any disclaimer, the term of this patent is extended or adjusted under 35 U.S.C. 154(b) by 0 days.

(21) Appl. No.: 09/289,407

(22) Filed: Apr. 9, 1999

Related U.S. Application Data

(60) Provisional application No. 60/081,657, filed on Apr. 14, 1998.

(51) Int. Cl.$^7$ .............................. G01J 5/00; G01J 5/10
(52) U.S. Cl. ....................................... 374/131; 374/144
(58) Field of Search ................................ 374/131, 144, 374/153, 129

(56) References Cited

U.S. PATENT DOCUMENTS

| | | | |
|---|---|---|---|
| 3,855,864 A | | 12/1974 | Douglas |
| 4,306,835 A | | 12/1981 | Hurley |
| 4,326,798 A | * | 4/1982 | Kahn ......................... 374/144 |
| 4,444,516 A | * | 4/1984 | Dostoomian et al. ....... 374/131 |
| 4,582,426 A | | 4/1986 | Douglas |
| 4,764,025 A | * | 8/1988 | Jensen ........................ 374/144 |
| 4,797,006 A | * | 1/1989 | Masom ....................... 374/131 |
| 4,932,789 A | * | 6/1990 | Egawa et al. ................ 374/131 |
| 4,985,858 A | | 1/1991 | Morrison, Jr. et al. |
| 5,226,731 A | * | 7/1993 | Allen .......................... 374/144 |
| 5,239,488 A | | 8/1993 | Markham et al. |
| 5,265,036 A | * | 11/1993 | Suarez-Gonzalez et al. 374/144 |
| 5,293,877 A | * | 3/1994 | O'Hara et al. .............. 374/131 |
| 5,440,664 A | | 8/1995 | Harrington et al. |
| 5,626,139 A | * | 5/1997 | Szeles et al. ................ 374/131 |
| 5,653,537 A | * | 8/1997 | Ignatowicz et al. ......... 374/131 |
| 5,785,426 A | * | 7/1998 | Woskov et al. ............. 374/131 |
| 5,820,264 A | * | 10/1998 | Tsao et al. .................. 374/131 |
| 5,893,643 A | * | 4/1999 | Kumar et al. ............... 374/131 |

FOREIGN PATENT DOCUMENTS

JP        0076086   *  6/1977 ................. 374/131

* cited by examiner

Primary Examiner—Diego Gutierrez
Assistant Examiner—Madeline Gonzalez
(74) Attorney, Agent, or Firm—Ira S. Dorman

(57) ABSTRACT

The high-speed radiation thermometer has an infrared measurement wavelength band that is matched to the infrared wavelength band of near-blackbody emittance of ceramic components and ceramic thermal barrier coatings used in turbine engines. It is comprised of a long wavelength infrared detector, a signal amplifier, an analog-to-digital converter, an optical system to collect radiation from the target, an optical filter, and an integral reference signal to maintain a calibrated response. A megahertz range electronic data acquisition system is connected to the radiation detector to operate on raw data obtained. Because the thermometer operates optimally at 8 to 12 $\mu$m, where emittance is near-blackbody for ceramics, interferences to measurements performed in turbine engines are minimized. The method and apparatus are optimized to enable mapping of surface temperatures on fast moving ceramic elements, and the thermometer can provide microsecond response, with inherent self-diagnostic and calibration-correction features.

18 Claims, 5 Drawing Sheets

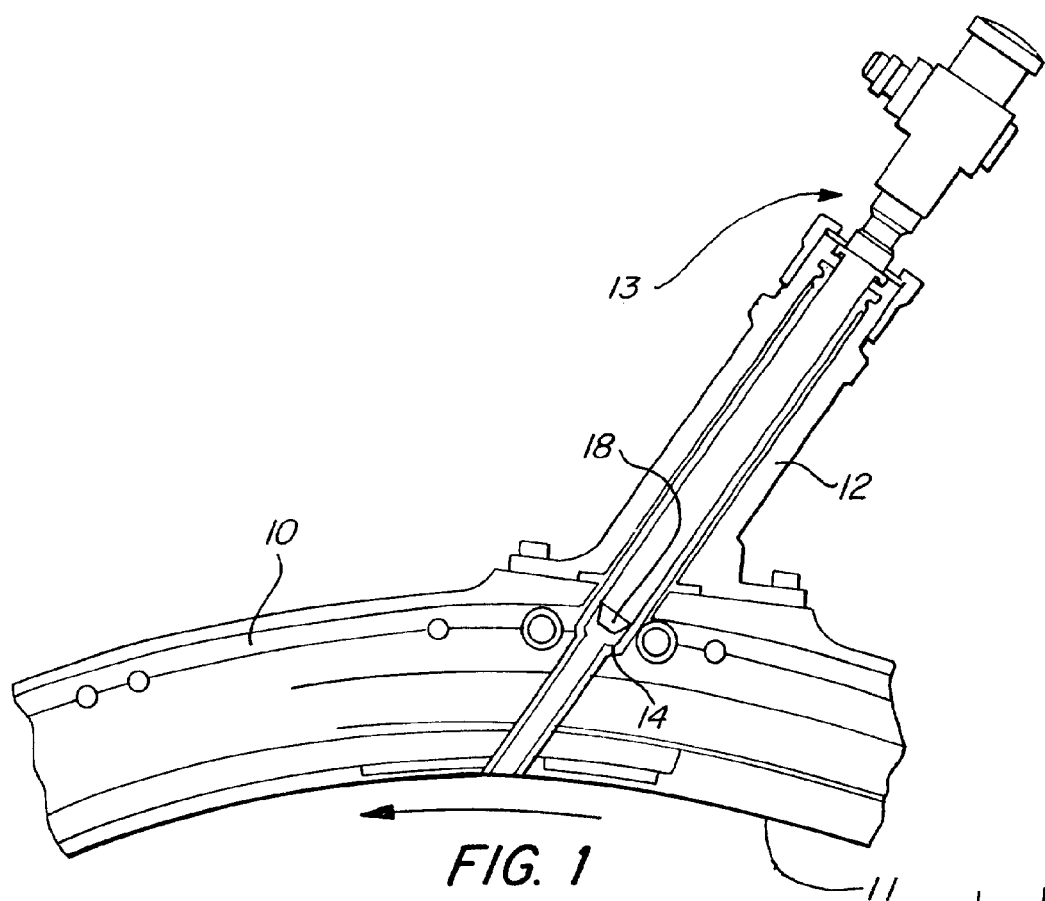
FIG. 1
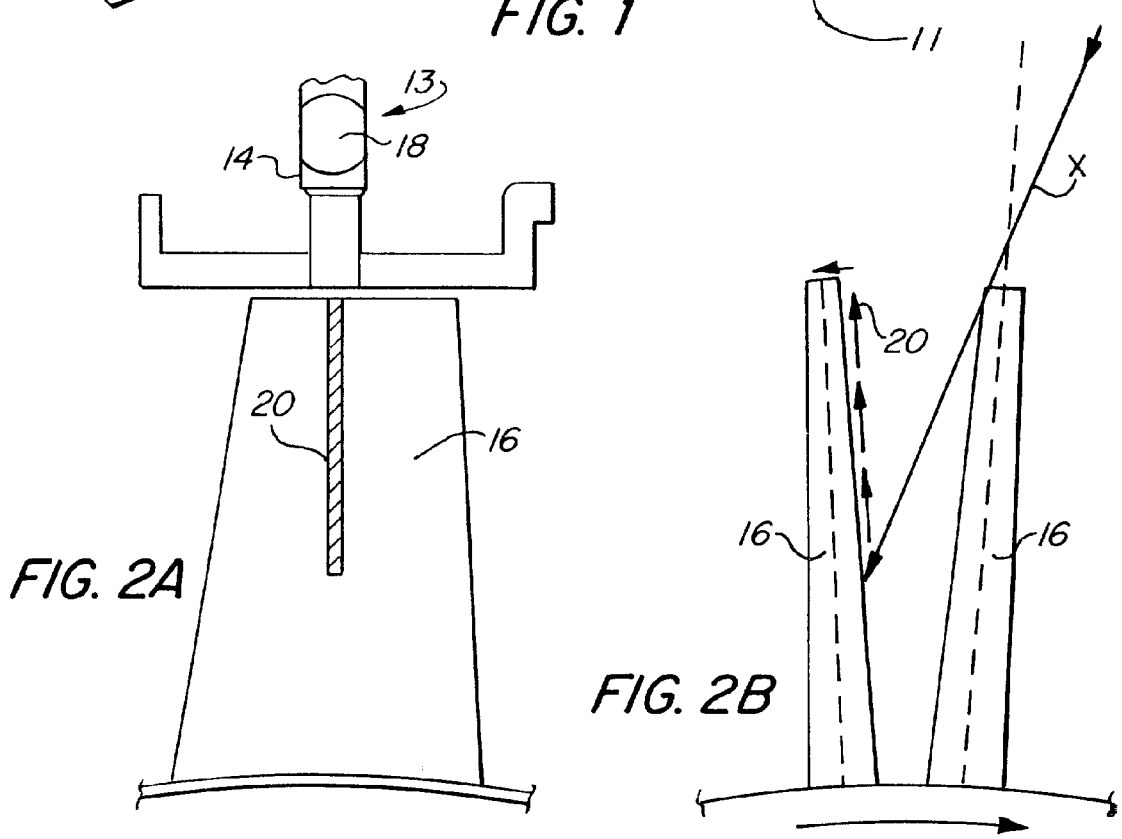
FIG. 2A
FIG. 2B

HIGH SPEED INFRARED RADIATION THERMOMETER, SYSTEM, AND METHOD

CROSS-REFERENCE TO RELATED PROVISIONAL APPLICATION

This application claims the benefit of provisional Application Ser. No. 60/081,657, bearing the foregoing title and filed on Apr. 14, 1998 in the name of the inventor designated herein.

STATEMENT REGARDING GOVERNMENT INTEREST

The United States Government has rights in this invention under Department of Energy Contract No. DE-FG02-96ER82112.

BACKGROUND OF THE INVENTION

Advanced thermal barrier coating materials, generally of ceramic composition, have been developed and are being further developed for use on the combustor section hardware of high-performance gas turbine engines. To optimize the utility of such materials, accurate surface temperature measurements are required so as to better understand their responses to changes in the combustion environment; accurate temperature measurements are also necessary, moreover, to adequately evaluate engine performance, and life.

Present temperature sensors and pyrometer systems applied to combustor section hardware of turbine engines are based on the measurement of electromagnetic radiation emitted by traditional metal components (i.e., non-coherent, hot body-generated radiation) in short wavelength ranges, typically 0.4 to 1.8 $\mu$m. For several reasons such systems are not well-suited for use in connection with high-performance gas turbine engines that utilize ceramic and ceramic coated materials. In particular, emittance values (which are of course necessary for making such temperature measurements) are low and variable at short wavelengths, and many of the coatings of interest are transparent to such radiation.

It is well known in the art to employ radiation pyrometers to measure the temperature of an object (e.g., rotor blades of a gas turbine engine) moving at high speed through the field of view of the pyrometer, wherein the pyrometer produces an output signal that is proportionate to the intensity of incident radiation emanating from the surface of the object. Such a pyrometer may include a detector at one end of a radiation transmission system, and an optical lens at the opposite end, as well as gating means for repetitively interrupting passage of the temperature signals. Representative systems are described, for example, in U.S. Pat. Nos. 3,855,864, 4,306,835, 4,582,426, 4,797,006, and 5,226,731.

It is also known to determine the surface temperature of an object by measuring its radiance at wavelengths at which the material exhibits strong absorption bands (resulting in the so-called "Christiansen effect"), thereby enabling the temperature to be determined readily and accurately (without reflection error) by correlation of the measured radiance to that of a black body at the same wavelength value. Such a technique is described in U.S. Pat. Nos. 4,985,858 and 5,239,488.

From U.S. Pat. No. 5,440,664, it is know to transmit mid-infrared radiation through a hollow waveguide. The waveguide serves for the transmission of laser radiation with low attenuation and with the preservation of good transverse spacial coherence, and is believed to be particularly adapted to transport laser radiation for biomedical/surgical applications, at a suitable power but in a non-quantitative fashion; cooling, and high-pressure features, are not believed to be required.

SUMMARY OF THE INVENTION

Accordingly, the broad objects of the present invention are to provide a radiation thermometer or pyrometer, pyrometer system, and pyrometric method adapted for accurately and rapidly measuring the temperature of hot elements, and in particular hot elements in a combustion gas environment, especially elements that are fabricated from ceramic or that carry a ceramic thermal barrier coating and that may be moving at high speed, as in a gas turbine engine.

Certain of the foregoing and related objects of the invention are attained, in accordance with the present invention, by the provision of a temperature-monitored system, and a radiation pyrometer for incorporation thereinto, wherein the system includes apparatus having structure defining a combustion chamber. The radiation pyrometer comprises, in combination:

means for collecting and transmitting electromagnetic radiation, including a hollow core waveguide having entry and exit ends, and means for directing radiation into the core of the waveguide at its entry end;

means for mounting the means for collecting and transmitting with the means for collecting disposed for receiving, and directing into the waveguide core, radiation emanating from at least one surface within the chamber;

a radiation detector that is responsive for generating electrical signals indicative of the energy of impinging radiation lying in a spectral region encompassing mid-infrared and long-infrared wavelengths, the detector being operatively connected to the exit end of the waveguide for receiving radiation transmitted through the core thereof;

radiation discriminating means for permitting substantial passage of radiation only within the designated spectral region, the discriminating means being operatively disposed for permitting substantial passage to the detector of radiation of wavelengths only within the spectral region;

data acquisition means operatively connected to receive such indicative electrical signals from the detector; and electronic data processing means operatively connected and programmed for determining, from signals received from the data acquisition means, the temperature of the surface from which emitted radiation is collected by the collecting and transmitting means.

In preferred embodiments the designated spectral region for operation of the pyrometer will be constituted of wavelengths in the range 2 to 50, preferably 8 to 12, and most desirably 10 to 11.5 microns. In those embodiments in which the narrower ranges are employed, and the monitored surface is of a ceramic material, the data processing means will most beneficially be programmed to correlate measured spectral radiance to the radiance of a black body at wavelengths within the designated range, so as to take advantage of the Christiansen effect. Use of the narrower ranges is additionally advantageous from the standpoint of minimizing interference from water and carbon dioxide, and thus enabling accurate temperature measurements to be made in a combustion gas environment.

The means for mounting may comprise a probe body having a cavity within which at least an entry end portion of the waveguide, and the means for directing, are mounted, the probe body defining a fluid-flow space within the cavity along the means for directing and the entry end portion of the waveguide, and having means thereon for introducing a protective fluid into the fluid-flow space therewithin. The means for directing radiation will normally comprise a lens disposed adjacent the gentry end of the waveguide for focusing radiation into its core.

In especially preferred embodiments, the apparatus of the invention will comprise a gas turbine engine comprised of a housing or case defining a combustion chamber, and having at least one rotor with a multiplicity of blades thereon, driven by combustion gases. The monitored surface will comprise the surface of an internal part of the engine, most advantageously surfaces on the rotor blades, and the system will optimally be constructed to enable determinations to be made of the surface temperature of each of the blades of an engine rotor as they move through the field of view of the pyrometer probe optics.

The system may additionally include gating means operatively positioned and cyclically operational to alternatingly pass and block the transmission of a radiation beam through the waveguide core to the detector, the gating means including a black body element for blocking the radiation beam and for providing a self-calibration reference for the pyrometer. The radiation discriminating means will usually comprise a band-pass filter, and the radiation detector will typically be selected from the group consisting of MCT, InSb, and DTGS detectors, other infrared-sensitive detectors can of course be used, as well.

Additional objects of the invention are attained by the provision of a method for determining the temperature of a monitored surface in a combustion gas environment, comprising the steps:

collecting radiation, in a spectral region encompassing mid-infrared and long-infrared wavelengths, emanating from the monitored surface;

transmitting the collected radiation through the core of a hollow core waveguide to a radiation detector that is responsive for generating electrical signals indicative of the energy of impinging radiation lying in the designated spectral region; and processing the generated signals so as to determine therefrom the temperature of the monitored surface.

Here again, the designated spectral region will usually constitute wavelengths in the range 2 to 50, preferably 8 to 12, and most desirably 10 to 11.5, microns, the narrower ranges being especially desirable when the monitored surface is comprised of a ceramic material, so as to exploit the Christiansen effect, and for making measurements in the presence of ambient combustion gases. It should be noted that the method (and apparatus) of the invention is suitable for monitoring and measuring the temperature of a surface of virtually any material, as long as the emissivity of that material is known or can be determined. The method may employ gating means, enabling self-calibration, and it may include an additional step of directly or indirectly bathing, with a protective fluid, at least the portion of the waveguide that is proximate to the monitored surface, the protective fluid serving a cooling function, a cleaning function, or both.

BRIEF DESCRIPTION OF THE DRAWINGS

FIG. 1 is a fragmentary schematic diagram showing a section of the engine casing, or blade outer shield, in the high temperature combustion section of a gas turbine engine embodying the system of the invention, with a bolt-on attachment holding the sensor probe of a pyrometer, also embodying the invention;

FIGS. 2A and 2B are schematic diagrams showing the pyrometer probe/turbine blade relationship, taken on planes that are parallel and perpendicular, respectively, to the axis of rotation of the turbine blade assembly;

DETAILED DESCRIPTION OF THE PREFERRED AND ILLUSTRATED EMBODIMENTS

Figure 3A:
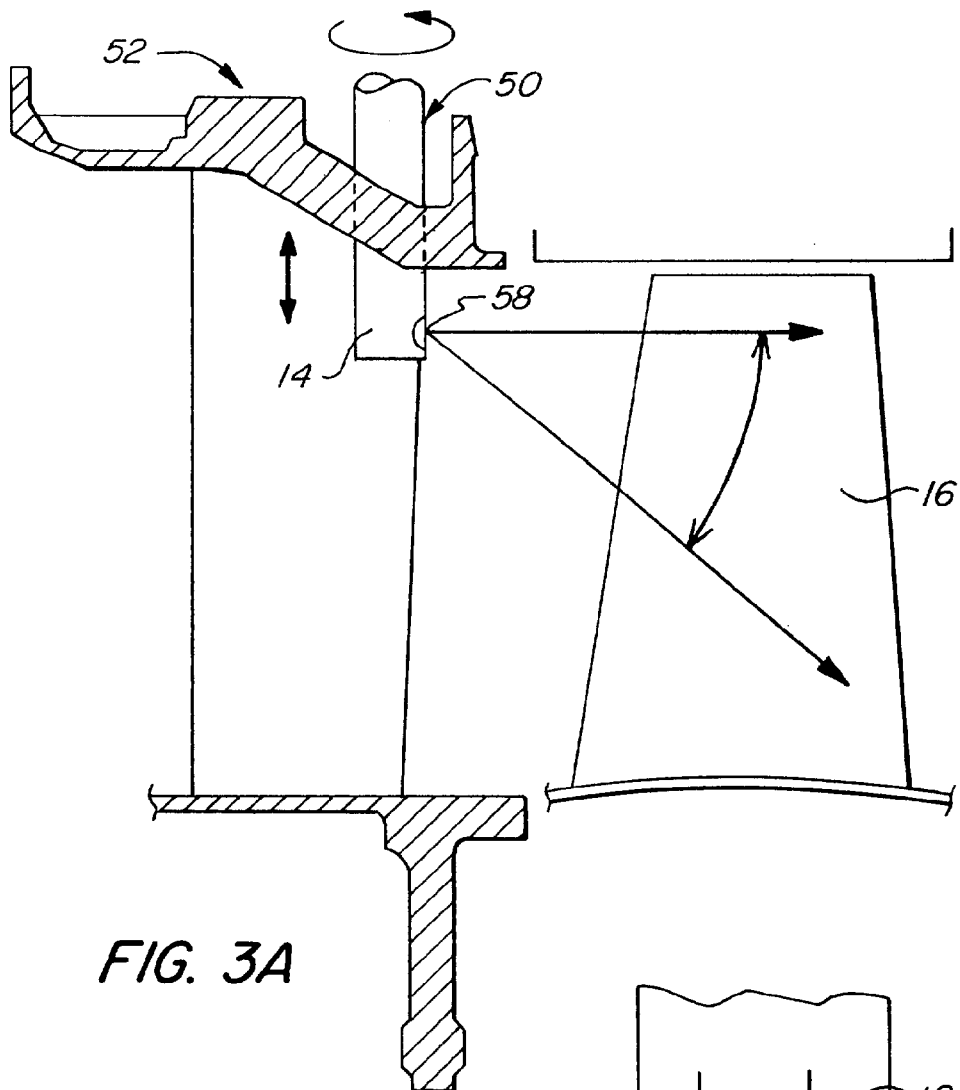
FIG. 3A is a schematic diagram showing an alterative pyrometer probe/turbine blade relationship in which an intrusion probe with an actuator mirror is used to provide the field-of-view to the blade.

The invention provides an accurate, fast-response radiation pyrometer that is particularly adapted for dynamically measuring the temperature of first stage gas turbine rotor blades of ceramic or carrying ceramic thermal barrier coatings. FIG. 1 schematically illustrates the outer air shield or engine case 10 of a gas turbine engine, having an attached assembly 12 for mounting a pyrometer sensor or probe, generally designated by the numeral 13, an end portion 14 of which extends through the casing 10 into the combustion chamber 11 therewithin. As depicted in FIG. 1, the probe 13 presents a "forward, looking aft" view, with the direction of rotor rotation indicated by the arrow, in which the sensing elements, or optics, of the pyrometer are directed away from the axis of rotation.

FIGS. 2A and 2B illustrate the view of the rotor blades 16 that is afforded to the probe sensing elements. The off-normal view (i.e., taken along line X, which is typically displaced 23° to 30° from normal) allows the probe 13, focussed through lens 18, to "scan" each sequential blade along a trace region 20 as it rotates (in the direction indicated by the arrow in FIG. 2B) through the field of view. One side and the top of each blade go through the pyrometer's field of view. Depending upon the directional view angle, it will be appreciated that temperature measurements can be obtained from either the positive or negative pressure surfaces of the blades. Surface temperature profiles, following blade internal cooling passages, can thereby be developed. The arrangement also permits temperature measurements to be made from the top or tip of each blade as well, as is important to enable monitoring for blade rub on the outer air seal.

Figure 3B:
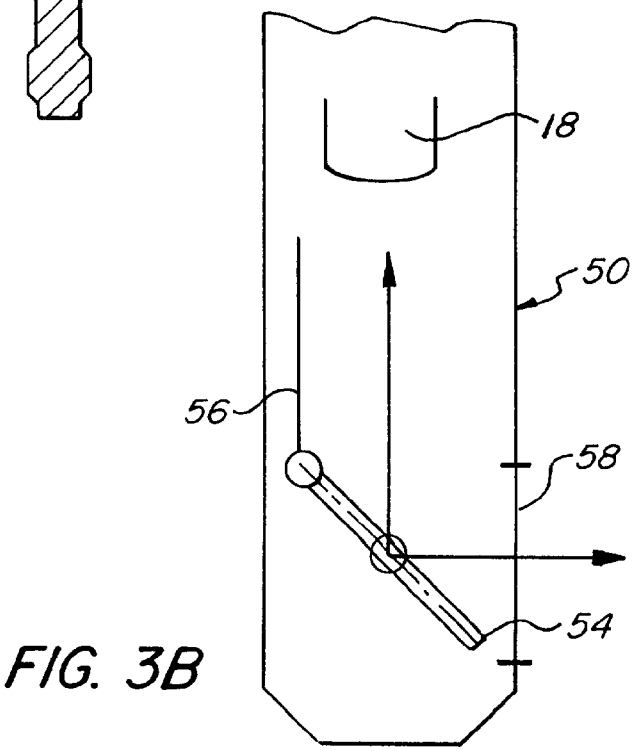
FIG. 3B is on a schematic view, drawn to an enlarged scale, showing a section taken through the probe.

FIG. 3A shows the view of one of the rotor blades 16 that is afforded to the sensing elements of a probe generally designated by the numeral 50. The probe 50 is mounted in the outer blade seal structure of the engine, generally designated by the numeral 52, for axial and rotatable movement. As is seen in FIG. 3B, the probe 50 contains a pivotable actuator mirror 54; a linkage 56, connected to the mirror 54 and to an actuating motor (not shown), enables controlled tilting of the mirror. A scan of the blade surface can thereby be taken through the sight aperture 58 and reflected to the focusing lens 18. Typically, the scan arc will span a portion or all of a directional length of part surface.

Figure 4:
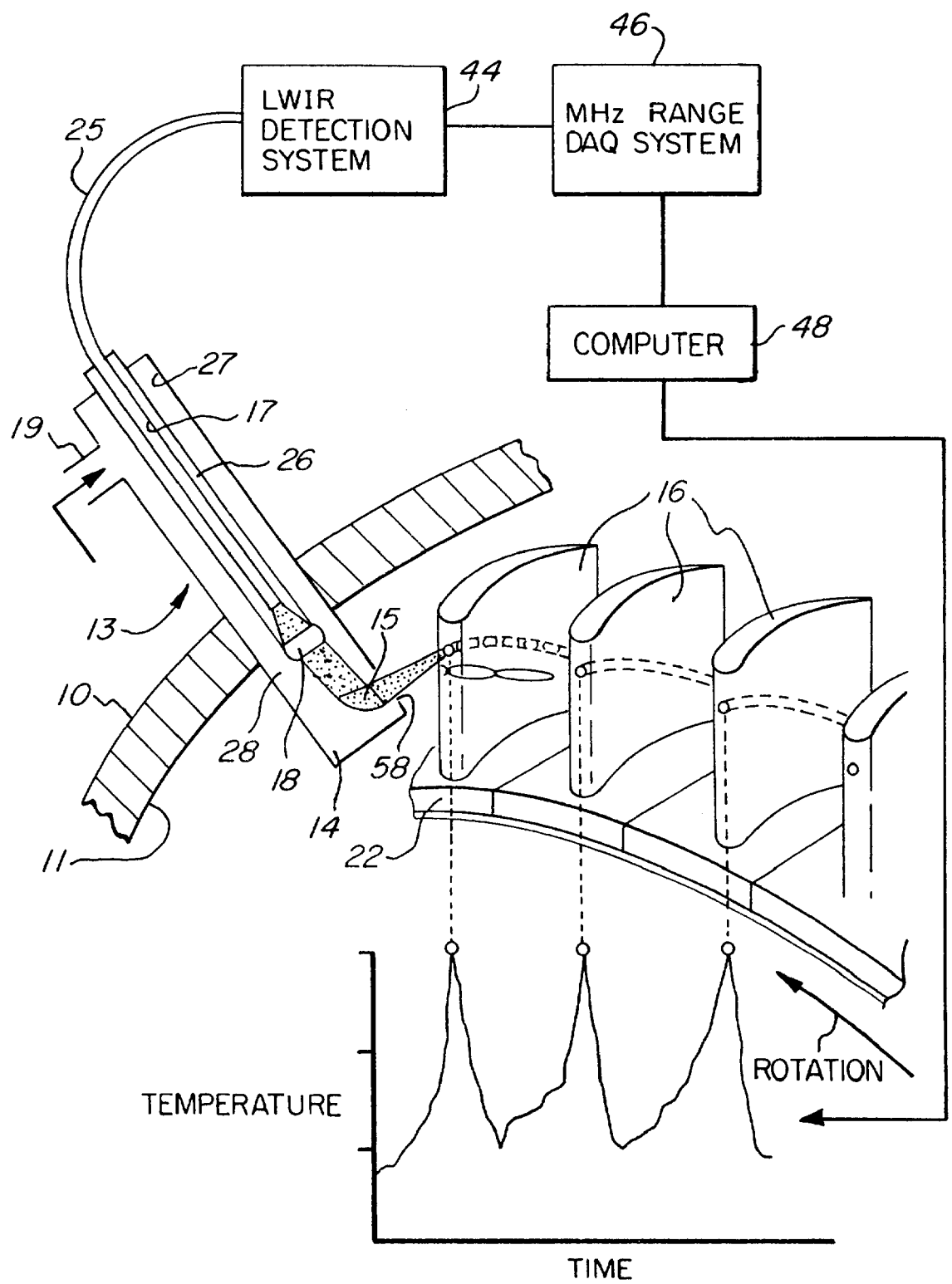
FIG. 4 is a schematic diagram showing features of the sensor probe, and its physical relationship the leading edges and pressure surfaces of first stage turbine rotor blades, together with a chart that illustrates and correlates to the blades the temperature profile generated by the data acquisition and processing components of the system.

FIG. 4 shows an arrangement for monitoring the leading edge and the positive pressure side of each blade 16 mounted on the rotor 22, as it rotates in the direction indicated. Included in the Figure is a temperature trace produced by the instrument of the invention, as developed using the data acquisition and processing component 24. The Figure also shows diagrammatically features of the probe and pyrometer system of the invention, as will be discussed more fully hereinbelow.

Figure 5:
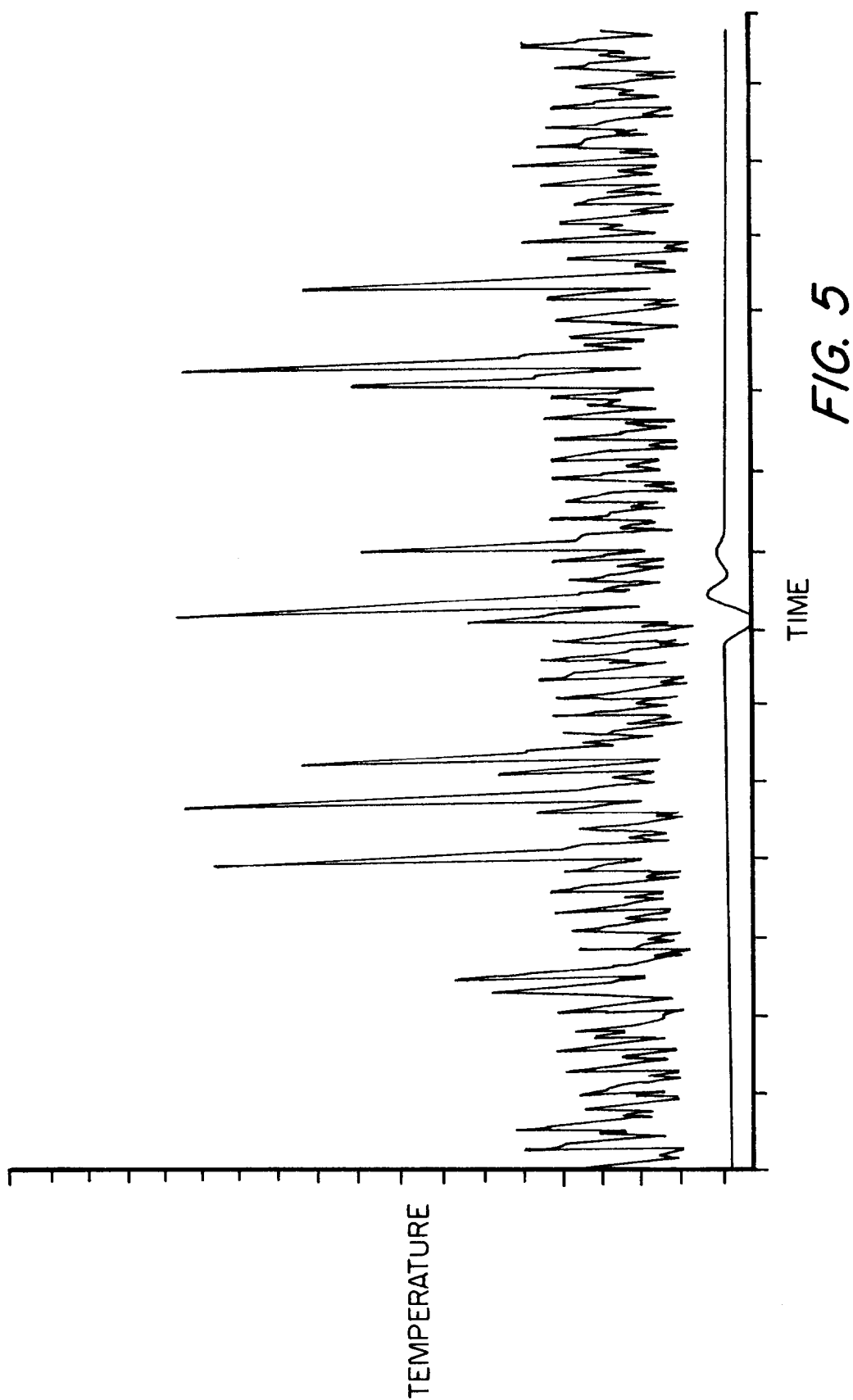
FIG. 5 is a data trace that is representative of the temperature of each of multiple rotor blades that are monitored and measured utilizing the method and apparatus of the invention.

FIG. 5 presents an extended version of the data trace that is produced by the pyrometer from the moving blades of an operating turbine engine rotor. The several spikes in the data trace indicate that the corresponding blades are at excessively high temperatures, which may be due, for example, to blade rub on the outer engine seal or to blocked cooling passages.

Figure 6:
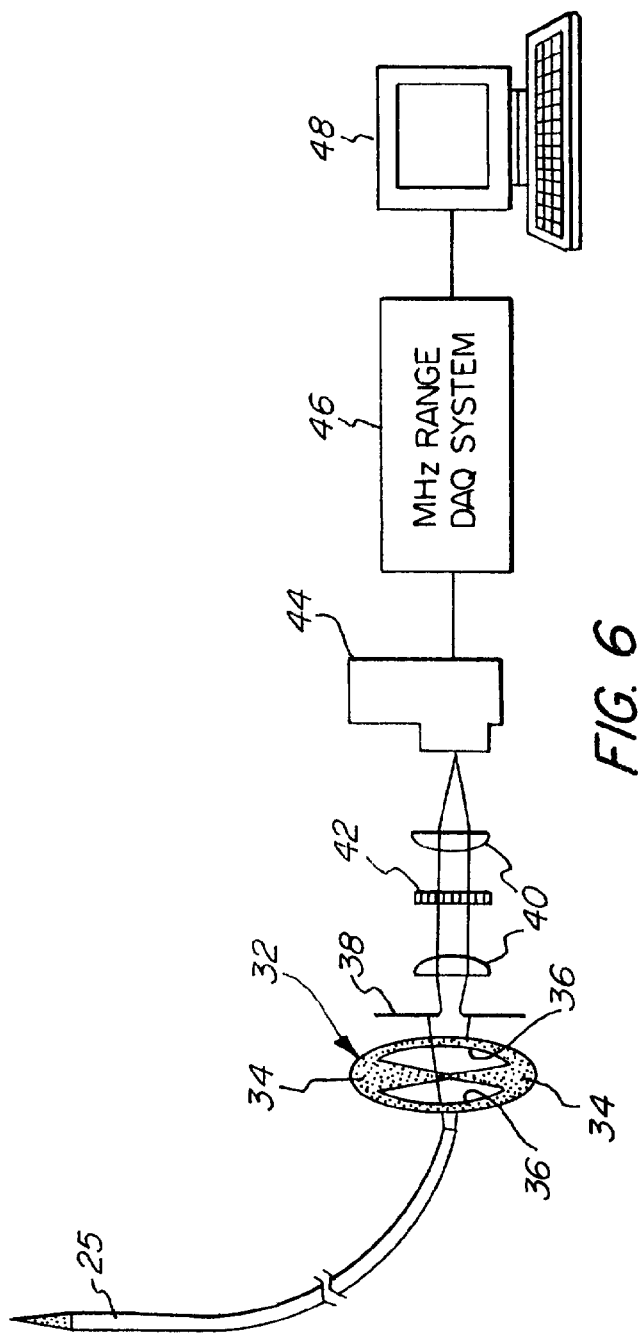
FIG. 6 is a schematic diagram of a pyrometer system embodying the invention.

FIG. 6 is schematic representation of the pyrometer of the invention, as constructed for measuring rotor blade temperatures (it being appreciated that other applications may employ similar or different configurations). More particularly, and taken with FIG. 4, the system shown comprises a hollow waveguide 25, an end portion of which passes through a sleeve 26 on end of which is mounted the lens 18. The sleeve 26 is supported (by means not shown) within the cavity 27 of a probe body 28, an end portion of which passes through the engine case 10 into the combustion chamber 11. A mirror 15 reflects radiation toward the lens 18, which in turn focuses it into the core 17 of the waveguide 25. Port structure 19 is formed on the probe body 28, through which a protective fluid (e.g., nitrogen, helium, or air) may be introduced into the cavity 27 for cleaning and cooling the probe components (e.g., the end portion of the waveguide 25, the lens 18, and the mirror 15); water or like liquid may also be used for cooling purposes, provided the probe body is formed to accommodate it. The fluid exits through the aperture 58, and so is introduced under a sufficient pressure (typically, 650 to 900 psi) to act against the pressure within the combustion chamber 11. For the same reason, the lens (typically made of zinc selenide) must be relatively thick and sealed to withstand the high ambient pressure.

Hollow waveguides (which will preferably also be flexible) can be made of sapphire, glass, plastic, or other suitable material, and function as part of the sensor; normally, the bore of glass and plastic waveguides will be coated with silver, gold, or the like, which may in turn carry a protective dielectric film layer. The bore diameter of the waveguide will generally range from 200 to 2000 microns. A chopper wheel, generally designated by the numeral 32, is rotatably mounted on a conventional chopper drive unit (not shown), and comprises two black-body vanes 34, for generating reference signals, with interposed spaces 36 for data acquisition. The number and spacing of the vanes in any given case will depend upon several factors, including the periodicity of sampling, the speed of the hardware being measured, and the speed of rotation of the wheel 32, as will be apparent to those skilled in the art. It will also be appreciated that other conventional gating means (e.g., linear action mechanisms, or shutters) can be employed if so desired. Furthermore, a resonant optical modulator (e.g., a tuning fork chopper) could be used instead of a motor-driven wheel.

After traversing the chopper wheel 32, the beam exiting the waveguide may pass through an aperture element 38 (which will be unnecessary in many instances), two planoconvex lenses 40, and an interposed band-pass filter 42 to a radiation detector 44. The raw sensor signal from the detector 44 is provided to a megahertz range data acquisition system 46 (comprised for example of AD829 operational amplifiers, and a PCL-M10-16E-1 1.25 MHz data acquisition board commercially available from National Instruments, Inc.), and finally to a computer 48 for electronic data processing. A symmetrical modulation of the target signal is performed due to the geometry of the chopper blade.

Figure 7:
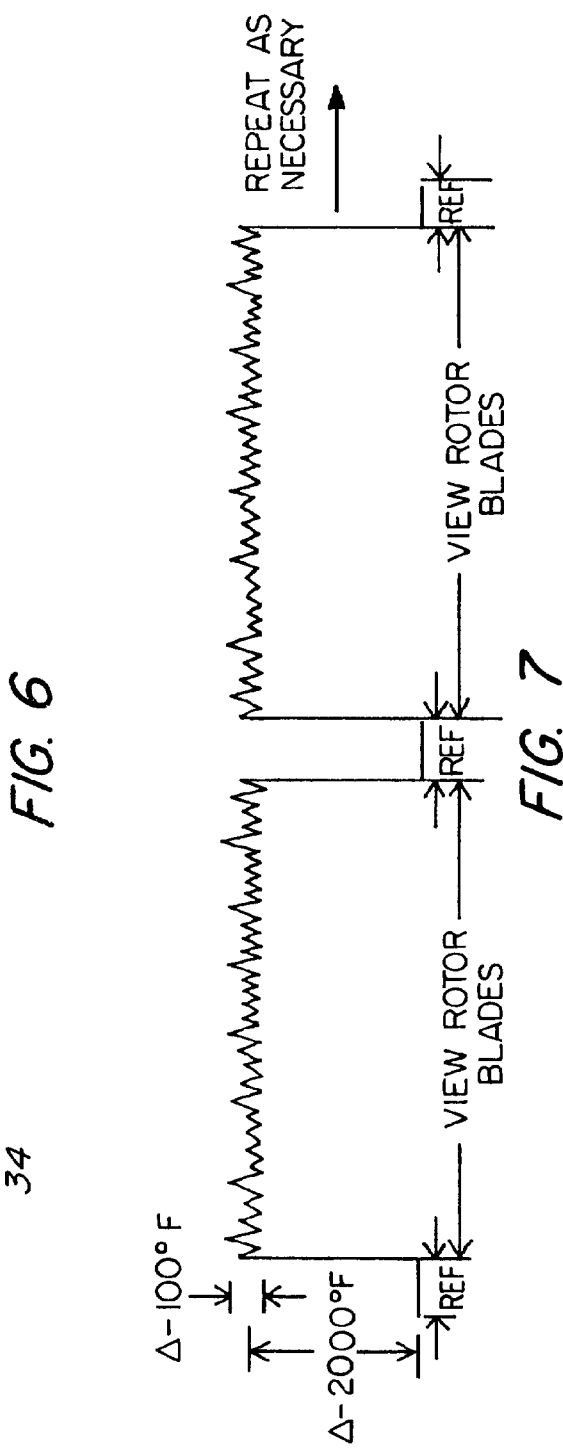
FIG. 7 is a schematic illustration of a data stream generated by the present system and used to provide temperature profiles for individual blades of a turbine rotor being monitored and measured.

FIG. 7 illustrates the measurement methodology used for signal acquisition in the present pyrometer. The radiant energy from the target will be modulated (chopped) at a slow rate relative to the blade rate. This will allow one or more rotations of the blade sequence to pass through the field of view of the sensor during each chopper-open condition. For a rotor having 50 blades, for example, a typical rate of 20,000 blades per second indicates a rotor rotation rate of 400 Hz. This allows modulation with operatively stable hardware of a kind that is presently commercially available for rates below 20 kHz.

The chopper-closed condition provides the instrument its reference (designated "ref" in FIG. 7) or background signal, and can be of much shorter duration than the chopper-open condition (designated "view rotor blades") to thereby maximize the blade viewing time. With this measurement methodology the detector reference signal will be updated immediately before and immediately after each radiance collection. With a stable optical system the ratio of signal intensity between the detector's reference voltage and sample voltage is dependent upon only the sample radiance (or temperature) received by the detector. By updating the reference signal as described, measurement errors due to any slow DC voltage drifts of the detector are eliminated; this constitutes a unique and highly advantageous feature of the present invention.

In the chopper-open condition the detector signal, taken as a function of time, contains the temperature information for each turbine blade as it passes the field of view. As can be seen, the measured temperatures are in a range of about 100° F., and the differential between the blade temperatures and the reference is about 2000° F. The chopper-open signal must be collected by a data acquisition system that operates with adequate speed to allow the required spatial resolution of the temperature information, and that thereby enables a multiple point temperature profile to be obtained for each blade; the system employed digitizes at megahertz rates to allow analysis of individual blade temperatures.

The features that are required, therefore, in a temperature sensing device that is optimized for use for gas turbines analysis, in accordance with the present invention, therefore, include: (1) a high sampling rate, on the order of greater than 100 kHz; (2) a small spot size, less than 0.100 inch to as small as 0.020 inch, to provide discrete measurements, and (3) minimization of errors for acceptable high temperature precision (±20° F.) and repeatability (blade-to-blade, ±10° F.). Although the pyrometer must, as noted, exhibit a high sampling-rate capability, simply acquiring data at maximum speed is not regarded to be the best approach. Instead, the ratio of surface velocity to measurement spot size provides the sampling rate necessary to achieve optimal spatial resolution.

For example, at a typical surface velocity of 2000 feet per second and a measurement spot of 0.100 inch, a sampling rate of 240 kHz is indicated. Sampling at higher rates will result in "overlapped" measurements on the surface, whereas sampling at lower rates will result in measurements of averaged temperature of some distance across the surface that is larger than the spot diameter. As a second example, a 0.020 inch measurement spot for the same surface velocity would indicate a sampling rate of about 1.18 MHz for optimum spatial resolution. The foregoing indicates that tailoring the data acquisition system to conditions, rather than achieving the fastest data-acquisition rate possible, should be expected to afford the best results. While spatial resolution will be optimized by this approach, the signal-to-noise ratio will not, on the other hand, suffer as a result of using an unnecessarily fast rate of data acquisition.

It will be noted that a lock-in amplification circuit is not (as it has in the past) employed in the system of the invention. Such an amplifier requires that a measurement time constant (signal averaging) be specified for recovery of the sample signal. Unlike short wavelength pyrometers in which reference signals were generated from the chopper device rather than inherently, such an arrangement is not suitable for achieving the spatial resolution that is required for making measurements from fast-moving rotor blades. The present configuration will allow the instrument to record data at the fast response rate available from commercially available long wavelength infrared MCT detectors, which afford response to above 1 MHz for small detector elements, provided appropriate bias currents are applied.

Liquid nitrogen cooling has in the past been used to bring detector elements to their operating temperatures for long wavelength infrared measurements. The periodic filling with liquid nitrogen (which is required at about eight-hour intervals) is not generally acceptable however in industrial environments. Thermoelectric cooling is available on MCT detectors, but the operating temperatures attained are not low enough for detector sensitivity in the long wavelength infrared region. Detector manufactures can supply a variety of integral and split closed-cycle coolers for long wavelengths MCT detector operation, which produce sufficiently low temperatures while also alleviating any requirement for liquid nitrogen cooling, and it is believed that the present invention will best be implemented using such a detector.

The capabilities of digitizers, in particular plug-in data acquisition (DAQ) boards, have rapidly grown in the past few years and continue to grow. Current commercially available digitizers offer sampling rates into the MHz range. Single and multi-channel DAQ systems, complete with signal conditioning, A/D conversion, and driver software, are commercially available and are suitable for use in the systems of the present invention. High-speed peripheral component interconnect DAQ boards are also available with bus mastering done by the DAQ board itself, transferring data into RAM via direct memory access, without requiring the microprocessor. These products are designed and constructed for high accuracy with low noise, and are also suitable for use herein. Metal shielding is employed around sensitive analog sections of the DAQ board, with additional noise shields built into layers of the board with ground planes. Digital signal processor boards may also be used for high-speed data acquisition and processing.

Geometries for positioning the wave guide sensor relative to the rotor blades are indicated above. In order to provide the small measurement spot size required, a lens system will normally be used at the entrance of the hollow waveguide. The lens system will accept target radiance within its focal geometry, and transmit and refocus the radiance into the bore or core of the hollow waveguide. The target and image focal lengths necessary to provide a measurement spot size in the range required can readily be determined. It is to be appreciated that, as the blade moves through the field of view of the pyrometer, the distance between the target surface and the sensor is changing, as is typical for present short wavelength infrared, simple-angle pyrometer systems, and that the measured spot is actually elliptical since the view is not normal to the blade surface; the end of the probe will typically be spaced about 0.75 inch from the rotor blades, at the position of closest approach.

The material of choice for the target lens system is zinc selenide, which is not only transmissive in the long infrared wavelength region of primary interest but also has a very low absorption coefficient, is non-hydroscopic, has a high melting point, and is able to withstand high pressure gradients. Salt materials with high melting points (e.g., potassium chloride and potassium bromide) can also be fashioned into lenses that would be useful in the long wavelength infrared, but hygroscopic qualities and susceptibility to thermal shock would tend to render them less advantageous.

Thus, it can be seen that the present invention provides a novel pyrometer system that affords unique advantages over the prior art. The system is optimized for making temperature measurements from ceramics and ceramic thermal barrier coatings; it is sensitive to long-wavelength infrared radiation; it is optimized for narrow-band wavelength response; it enables highspeed measurement with small measurement spot size; it is selfcalibrating during operation; and it enables on-line temperature measurements to be made. In a specific application, the system and method of the invention enable dynamic, accurate temperature measurements to be made of internal components of advanced turbine engines; they replace short-wavelength infrared pyrometers that can only provide accurate temperature measurements on metal engine parts and that cannot provide accurate temperature measurements on ceramic and ceramic coated engine parts; they reduce potential interferences from water vapor and carbon dioxide gas in high-temperature, high-pressure engines; they provide pin-point measurements on fast moving engine parts, and enable temperature mapping across high-speed engine blades; they maintain calibrated response for high accuracy; and they provide a real-time indication of engine performance for turbine engine development as well as for monitoring of installed units.

It will be appreciated that the apparatus and method of the invention are well suited for use in many applications in addition to aircraft and power-generation turbine engines. For example, a pyrometer system of the character described could be employed for monitoring temperatures within reciprocating internal combustion engines; indeed, non-engine applications are also envisioned, such as in glass and ceramic manufacturing operations (e.g., for monitoring the temperature of the glass or ceramic body). It will also be appreciated that the probe may sense radiation from either moving or stationary parts, such as (to illustrate the latter) the combustion liner, the vanes, or the fuel-injection nozzles of a turbine engine. Finally, although a pyrometer system of the kind specifically described is presently regarded to constitute the best mode for producing the invention, differently based system (e.g., incorporating an FT-IR spectrometer) may embody the invention in appropriate circumstances.

Having thus described the invention, what is claimed is:

1. In a temperature-monitored system, including apparatus having structure defining a combustion chamber and at least one ceramic surface therewithin, the improvement wherein said system further includes a radiation pyrometer comprising, in combination:

means for collecting and transmitting electromagnetic radiation, including a hollow core waveguide having entry and exit ends, and means for directing radiation into the hollow core of said waveguide at said entry end;

means for mounting said means for collecting and transmitting with said means for collecting disposed for receiving, and directing into said hollow waveguide core, radiation emanating from said at least one ceramic surface within said chamber;

a radiation detector that is responsive for generating electrical signals indicative of the energy of impinging radiation lying in a spectral range of 10 to 11.5 microns, said detector being operatively connected to said exit end of said waveguide for receiving radiation transmitted through said core thereof;

means for discriminating radiation, for permitting substantial passage of radiation only within said spectral range, said means for discriminating being operatively disposed for permitting substantial passage to said detector of radiation of wavelengths only within said spectral range;

data acquisition means operatively connected to receive such indicative electrical signals from said detector; and electronic data processing means operatively connected and programmed for determining, from signals received from said data acquisition means, the temperature of said at least one ceramic surface, said data processing means being programmed to correlate measured spectral radiance to the radiance of a black body at wavelengths within said range.

2. The system of claim 1 wherein said means for mounting comprises a probe body having a cavity within which at least an entry end portion of said waveguide, and said means for directing, are mounted, said probe body defining a fluid-flow space within said cavity along said means for directing and said entry end portion of said waveguide, and having means thereon for introducing a protective fluid into said fluid-flow space therewithin.

3. The system of claim 1 wherein said means for directing radiation comprises a lens disposed adjacent said entry end of said waveguide for focusing radiation into said core thereof.

4. The system of claim 1 wherein said apparatus comprises a gas turbine engine having at least one rotor, with a multiplicity of blades thereon, driven by combustion gases; wherein an engine case comprises said structure defining said combustion chamber; and wherein said at least one surface comprises the surface of an internal part of said engine.

5. The system of claim 4 wherein said internal part is said at least one rotor of said engine, and wherein said at least one surface is on said rotor blades.

6. The system of claim 1 wherein said means for discriminating radiation comprises a band-pass filter.

7. The system of claim 1 wherein said radiation detector is selected from the group consisting of MCT, InSb, and DTGS detectors.

8. A radiation pyrometer comprising, in combination:

means for collecting and transmitting electromagnetic radiation, including a hollow core waveguide having entry and exit ends, and means for directing radiation into the hollow core of said waveguide at said entry end;

a radiation detector that is responsive for generating electrical signals indicative of the energy of impinging radiation lying in a spectral range of 10 to 11.5 microns, said detector being operatively connected to said exit end of said waveguide for receiving radiation transmitted through said core thereof;

means for discriminating radiation, for permitting substantial passage of radiation only within said spectral range, said means for discriminating being operatively disposed for permitting substantial passage to said detector of radiation of wavelengths only within said spectral range;

data acquisition means operatively connected to receive such indicative electrical signals from said detector; and electronic data processing means operatively connected and programmed for determining, from signals received from said data acquisition means, the surface temperature of a ceramic body emitting radiation collected by said collecting and transmitting means, said data processing means being programmed to correlate measured spetral radiance to the radiance of a black body at wavelengths within said range.

9. The pyrometer of claim 8 wherein said means for directing radiation comprises a lens disposed adjacent said entry end of said waveguide for focusing radiation into said core thereof.

10. The pyrometer of claim 9 additionally including means for mounting comprised of a probe having a body within which said lens and an entry end portion of said waveguide are mounted.

11. The pyrometer of claim 10 wherein a fluid-flow space is defined within said probe body cavity along said means for detecting and said entry end portion of said waveguide, and wherein said probe body has means thereon for introducing a fluid into said fluid-flow space.

12. The pyrometer of claim 8 wherein said radiation detector is selected from the group consisting of MCT, InSb, and DTGS detectors.

13. The pyrometer of claim 8 wherein said means for discriminating radiation comprises a band-pass filter.

14. A method for determining the temperature of a monitored ceramic surface in a combustion gas environment, comprising the steps:

collecting radiation in a spectral range of 10 to 11.5 microns emanating from the monitored ceramic surface;

transmitting said collected radiation through the core of a hollow core waveguide to a radiation detector that is responsive for generating electrical signals indicative of the energy of impinging radiation lying in said spectral range; and processing said generated signals, using data processing means programmed to correlate measured spectral radiance to the radiance of a black body at wavelengths within said range, so as to determine therefrom the temperature of said monitored ceramic surface.

15. The method of claim 14 wherein said monitored surface comprises a heated internal part of an operating gas turbine engine having at least one rotor, with multiplicity of blades, driver by combustion gases.

16. The method of claim 15 wherein said monitored surface is on said rotor blades.

17. The method of claim 14 including the additional step of bathing, with a protective fluid, at least the portion of the waveguide that is proximate to said monitored surface.

18. The method of claim 17 wherein said protective fluid serves a cooling function, a cleaning function, or both functions.

* * * * *